(12) United States Patent
Guillot et al.

(10) Patent No.: US 8,461,780 B2
(45) Date of Patent: *Jun. 11, 2013

(54) METHOD FOR DRIVING A PTC ELECTRICAL LOAD ELEMENT

(75) Inventors: Laurent Guillot, Seysses (FR); Kamel Abouda, Saint Lys (FR); Philippe Rosado, Fonsorbes (FR); Helmut Henssler, Constance (DE); Uli Joos, Nonnenhorn (DE); Josef Schnell, Wasserburg (DE); Norbert Stuhler, Ravensburg (DE)

(73) Assignees: Freescale Semiconductor, Inc., Austin, TX (US); Conti Temic Microelectronic GmbH, Nuremberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/358,039

(22) Filed: Jan. 25, 2012

(65) Prior Publication Data

US 2012/0119678 A1 May 17, 2012

Related U.S. Application Data

(62) Division of application No. 12/297,477, filed as application No. PCT/IB2007/052679 on Apr. 16, 2007, now Pat. No. 8,134,308.

(30) Foreign Application Priority Data

Apr. 28, 2006 (DE) .................. 10 2006 019 784

(51) Int. Cl.
*H05B 41/36* (2006.01)
*H03K 17/14* (2006.01)

(52) U.S. Cl.
USPC ... 315/308; 315/79; 315/209 R; 315/209 CD; 361/103; 361/118; 307/10.1; 327/378; 327/512

(58) Field of Classification Search
USPC ............... 315/209 R, 209 CD, 219, 224, 309, 315/360, 311, 323, 79, 308; 307/10.1, 121, 307/10.7; 327/378, 512; 361/103, 118
See application file for complete search history.

(56) References Cited

U.S. PATENT DOCUMENTS

| 4,772,804 | A   | 9/1988  | Grimaud et al. |
|-----------|-----|---------|----------------|
| 6,333,568 | B1  | 12/2001 | Bitsche et al. |
| 6,420,832 | B2  | 7/2002  | Rabine         |
| 6,621,678 | B2  | 9/2003  | Wei et al.     |
| 6,879,115 | B2* | 4/2005  | Ribarich ............ 315/224 |
| 6,930,538 | B2  | 8/2005  | Chatal         |

(Continued)

FOREIGN PATENT DOCUMENTS

| DE | 3842921 A1  | 6/1990  |
|----|-------------|---------|
| DE | 10208638 A1 | 9/2003  |
| EP | 0240402 A1  | 10/1987 |

OTHER PUBLICATIONS

International Search Report mailed Dec. 28, 2007 for International Application No. PCT/IB2007/052679, 2 pages.

*Primary Examiner* — Vibol Tan

(57) ABSTRACT

A method is intended to make it possible to drive a PTC electrical load element with a switching unit with the highest possible operational reliability. For this purpose, the electric current is switched off if a predetermined current threshold value is exceeded, the magnitude of the current threshold value being determined from the operating parameters of the load element.

20 Claims, 4 Drawing Sheets

U.S. PATENT DOCUMENTS 7,330,002 B2 2/2008 Joung, II
2002/0080545 A1* 6/2002 Slater et al. .................. 361/106
2004/0007992 A1* 1/2004 Ribarich ...................... 315/291
2005/0231987 A1 10/2005 Ananias

* cited by examiner

METHOD FOR DRIVING A PTC ELECTRICAL LOAD ELEMENT

CROSS-REFERENCE TO RELATED APPLICATION(S)

This application is a divisional of U.S. patent application Ser. No. 12/297,477, entitled "Method for Driving a PTC Electrical Load Element," filed on Oct. 17, 2008, which is a National Stage Entry under 37 C.F.R. §371 of PCT/IB2007/052679, filed Apr. 16, 2007, which claims priority to German Application No. DE 102006019784.4, filed on Apr. 28, 2006, the disclosures of which are hereby expressly incorporated by reference in their entirety.

FIELD OF THE DISCLOSURE

The present invention relates to a method for driving a PTC electrical load element. The invention further relates to a switching unit for a PTC electrical load element. The invention also relates to an arrangement of a switching unit and a PCT electrical load element. The invention further relates to an apparatus including such an arrangement.

BACKGROUND

In principle, electrical loads and load elements can be differentiated into so-called NTC (negative temperature coefficient) and PTC (positive temperature coefficient) thermistors. NTC thermistors are distinguished by a negative temperature coefficient, while PTC thermistors have a positive temperature coefficient. This means that in the case of NTC thermistors, such as in the case of semiconductors, for example, a temperature increase brings about a decrease in the electrical resistance. By contrast, in the case of PTC thermistors, a temperature increase also leads to a higher electrical resistance.

Many loads such as, for example, incandescent lamps or else other loads which have a PTC thermistor characteristic are increasingly being driven by an integrated switching unit. Integrated switching units have the advantage that they enable an electronic control in comparison with conventional switching units, so that various additional functions can be realized. In many cases it is also possible to reduce the current consumption, save space or, for example, monitor a load more simply.

Semiconductor components or integrated microelectronic circuits are generally used for an integrated switching unit. What is disadvantageous about semiconductor components and integrated semiconductor circuits, in principle, is that they can be destroyed comparatively easily by excessively high operating parameters such as, for example, voltage, current, electrical charge, temperature and air humidity. This concerns the reliability, on the one hand, in that the components are destroyed at elevated operating parameters over the course of time or else as a result of limit values of individual operation parameters being exceeded once. With the use of integrated semiconductor circuits for electrical loads, overload situations particularly often lead to a destruction of the switching unit. Situations of this type may occur for example as a result of short circuits or else as a result of switch-on or switch-off operations which cause high short-circuit currents and hence overloads.

There are various strategies for avoiding destruction of a semiconductor switching unit. The most widespread strategy consists in performing a temperature-dependent switch-off in the case of an excessively high energy dissipation, particularly at high ambient temperatures. What is disadvantageous about this method is a persistently high temperature, which has a disadvantageous effect on the reliability, and may finally also lead to a destruction of the switching unit. Other strategies employ linear current limiting that keeps the electric current in the switching unit below predetermined limit values. However, particularly in the case of the switch-on operation, in the case of capacitive loads or else in the case of incandescent lamps, this method leads to an increased voltage drop accompanied by a high power loss and thus a rapid temperature increase. The high temperature and, in particular, also the great temperature changes adversely influence the reliability of the switching unit, so that the latter may likewise be destroyed over the course of time.

A further strategy consists in performing a switch-off in a manner dependent on the electric current with a number of current levels adapted to the load. In the case where a respective current level is exceeded, the switching unit is immediately deactivated in order to protect it against destruction. However, this in turn has the disadvantage that when the switching unit is subjected to a restart initiated in response to this, it must be taken into account that the temperature of the load is still increased and the limiting current level may therefore be too high. This may in turn carry an excessively high overload during the switch-on operation in the switching unit, which may result in destruction of the switching unit.

SUMMARY

An object of the invention is to provide a method for driving a PTC electrical load element with a switching unit with which enables an increased operational reliability. Furthermore, an object of the intention is to specify a device for carrying out the method.

Therefore, the invention provides a method, a switching unit, an assembly and an apparatus as defined in the claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE DRAWINGS

Figure 1:
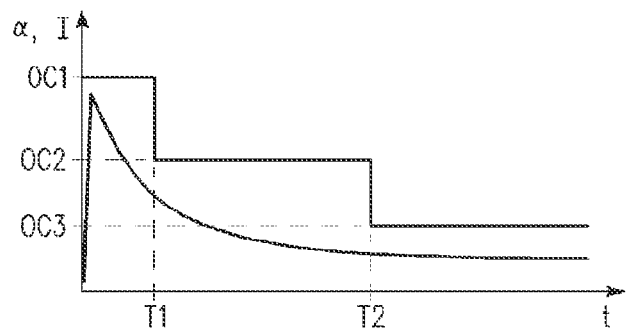
FIG. 1 shows an example of a profile of the current I and the overcurrent control OC of an incandescent lamp 1 against the time t.

As explained below in more detail, in a method for driving a PTC electrical load element, the electric current to the PCT electric load element may be switched off if a predetermined current threshold value is exceeded. The magnitude of the current threshold value may be determined from the operating parameters of the load element. Without wishing to be bound to any theory, it is believed that the operational reliability may thereby be improved because of the following.

During the operation of a PTC electrical load element, in the cold state, the electrical resistance is initially low and the current that corresponds thereto and flows in the load element is high. As a result of the heating of the load element in the course of operation, the resistance rises and the flowing current is reduced. This process lasts until the resistance value and the current have approximated to an equilibrium state, the resistance being increased and the current reduced in comparison with the cold starting state. This change influences the electronics of the switching unit.

In this case, a distinction may be made between an influencing during operation, on the one hand, and an influencing during switch-on operations, on the other hand. In the case of a rise in the resistance and a reduced current flowing in the load element as a result of the increased temperature, there is the risk of an overloading of the circuit electronics. The situation is similar during a switch-on operation if the load element is still heated from the previous operating interval and accordingly has an increased electrical resistance. In this case, the excessively high current fed by the switching unit likewise leads to an overload.

In principle, therefore, for the case of a cold load element, a corresponding protection device would have to be implemented in order to avoid excessively high switch-on currents. In addition, the protection device would, however, also have to take account of the present temperature and heating of the load element. The current fed via the switching unit would therefore have to be switched off in such a way that the operating limits of the switching unit which are critical for a switch-off are dimensioned by way of the respective operating parameters present for the load element. For this purpose, a current threshold value may be predetermined for the electric current as a limitation starting from which the latter is switched off. In this case, the magnitude of the current threshold value may be determined from the operating parameters of the load element. In this case, the values present at the respective point in time can be used as operating parameters. As an alternative, it is also possible to use operating parameters which were present temporally prior to the limiting of the current at the PTC load element, such as in the temporally preceding operating interval or the last switch-off and switch-on operation.

Values of the operating parameters may be stored for this purpose.

For the adaptation of predetermined current threshold values to the characteristic of the PTC load element, a current threshold value may be predetermined by a flowchart. In this case, the individual current threshold values of a flowchart can be predetermined by means of individual operating parameters such as the time or the temperature of the load element.

In order to take account, during a switch-on operation, of the fact that a load element has already cooled again from the previous operation and, by virtue of the accompanying reduction of the resistance of the load element, an overloading of the switching unit does not occur during the switch-on operation, a current threshold value may be expediently predetermined in the case of switch-on if a predetermined minimum time since the last switch-off operation has been exceeded. For this purpose, it is possible to use suitable relationships of the temporal cooling behaviour of the PTC load element.

This procedure may also be carried out directly depending on the temperature of the load element. For this purpose, a current threshold value may be predetermined if the temperature of the load element falls below a predetermined value.

For a switch-on operation in which a PTC load element has an increased temperature and thus a still increased resistance on account of the previous operating interval, the current threshold value of the switch-on current may be dimensioned in such a way that the switching unit cannot be overloaded. For this purpose, this current threshold value may be predetermined which was predetermined before the last switch-off operation if a predetermined minimum time between the last switch-off operation and the switch-on operation has not been exceeded. In this case, the current value that was predetermined last may be valid as maximum switch-off limitation because a corresponding reduction in the temperature of the electrical load element has not been effected since the last switch-off operation on account of the predetermined minimum time that has not yet been exceeded.

In the case of switch-on operations on account of fault-dictated switch-off processes, the predetermined current threshold value may be dimensioned to the previously predetermined current value. For this purpose, for a switch-on operation after a switch-off operation, for a current threshold value, that current threshold value may be predetermined which was predetermined before the last switch-off operation if said switch-off operation was effected as a result of a short-circuit identification and/or a temperature-dictated switch-off.

In this case, the information about the switch-off operation on account of a possible short circuit or a temperature-dictated switch-off process may be stored as operating parameter. For this purpose, the presently attained predetermined current threshold value may be stored during a switch-off operation.

For an adaptation of the predetermined current value to the operating parameters that change in the course of events, a predetermined current threshold value in each case may be reduced in steps in the case where predetermined operating parameters are exceeded. For this purpose, the individual steps may be individually adapted to the operating parameters and a respective load element or may be predetermined in the form of a flowchart.

For this purpose, the temperature of the load element may be expediently used as operating parameter. Without wishing to be bound to any theory, said temperature is believed to be in a direct relationship with the electrical resistance of a PTC load element.

This procedure may also be effected indirectly depending on operating variables which are in a relationship with the temperature or the electrical resistance of a PTC load element. For this purpose, the time since the switch-on and/or the time since reaching a new step of a current threshold value may be chosen as operating parameter.

The voltage drop across the load element may also expediently be chosen as operating parameter. Without wishing to be bound to any theory, said voltage drop is believed to be in a direct relationship with the electrical resistance of the PTC load element by way of the flowing current.

An advantage obtainable with the invention is that, in particular, a high operational reliability when driving electrical PTC load elements may be obtained. In this case, in particular, the switching unit used for this purpose can be protected against overloads and hence against destruction. In this case, an intelligent driving that corresponds to the status of the load element enables an adapted setting of the current limiting or of the automatic switch-off mechanism which is oriented to the operating parameters of the load element. This makes it possible to avoid excessively high power losses and hence a premature destruction of the switching unit.

The invention furthermore makes it possible to react in adapted fashion to unplanned switching-off, for example as a result of short circuits in that such unplanned switching-off is detected by way of the operating parameters and a restart is effected taking account of said detected parameters. Another advantage that may be obtained is that in the event of a restart caused by a short circuit, the energy that occurs during switching in the switching unit may be minimized.

A method for driving a PTC electrical load element 1 with a switching unit 3 may include switching off by the switching unit the electric current to the PCT electrical load element when a predetermined current threshold value is exceeded, an electric current. The current threshold value may be changed depending on the operational time of the load element. Referring to FIG. 1, for example, the profile of the current I of an incandescent lamp 1 is plotted against the time. On account of the electrical resistance rising in the course of operation, the current falls over time. In order that the switching unit by means of which the incandescent lamp 1 is driven is not overloaded, an overcurrent control OC is provided. In this case, the maximum current limiting values OC1, OC2 and OC3 at which the current is switched off, fall in stepwise fashion upon reaching the times T1 and T2, as emerges from FIG. 1.

In case the electric current is switched off, a parameter value of at least one operating state and/or operating parameter of the load element 1 may be determined When the electrical current is switched on, the current threshold value may be set depending on the determined parameter value. In case the electrical current is switched on again after having been switched off, the current threshold value may for example be determined depending on a time lapsed between switching off and switching on again or depending on a characteristic of a switching off procedure.

As an operating state from which the parameter value is determined, the states may be regarded in which the load is supervised by a current threshold value given for the respective operating state.

One or more values of the respective operating parameter at the time of switching off the electrical current may be stored. In such case, the current threshold value may be determined based on one or more of the stored values. The operating parameter may include one or more of the group consisting of: temperature of the load element, operating time of the load element, voltage drop over the load element, time lapsed after switching off the electrical current, time lapse after latest switching on, time after latest change of the current threshold value. Also, current threshold values, such as the current threshold value and/or a temperature threshold value, may be stored when the current is switched off.

The current threshold value may be limited to be below or be equal to a maximum current threshold value, and the current threshold value may be set to the maximum current threshold value when the electrical current is switched on. In such case, for instance, the maximum current threshold value may correspond to a temperature threshold for switching off the current in case the temperature of the load element comes below the temperature threshold.

The current threshold value may be limited to be below or be equal to a maximum current threshold value, and the current threshold value may be set to the maximum current threshold value when the electrical current is switched on after a period of time exceeding a predetermined minimal time.

At switching on, the current threshold value may be set to a previous current threshold value which was applicable at the moment of switching off. The current threshold value may for example be set to the previous current threshold value in case the electrical current is switched on after a period of time shorter than a predetermined minimal time. The predetermined minimal time may for instance be determined based on a cooling rate of the load element.

Also, the current threshold value may be determined to be the previous current threshold value in case the switching off was caused by an error, such as a short-circuit or an excess temperature. The previous current threshold value may for example correspond to a temperature threshold for the temperature of the load element.

Figure 2:
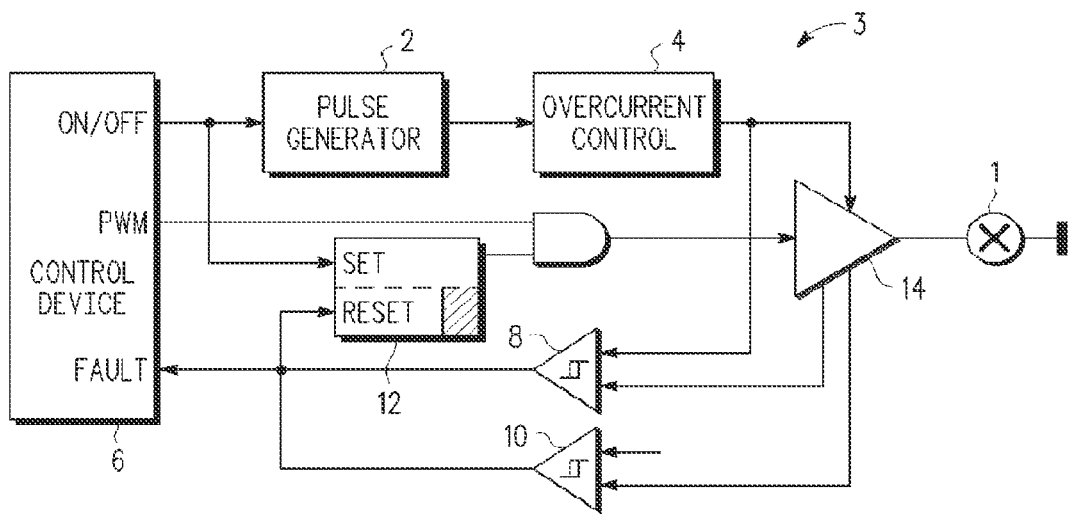
FIG. 2 shows an example of a circuit of a switching unit 3 for driving an incandescent lamp 1 with a control device 6.

In order to realize an overcurrent control, it is possible to use a switching unit 3 with a control device 6, which is illustrated in FIG. 2. The signal profiles corresponding to the circuit can be gathered from FIG. 3. The steps OC1, OC2 and OC3 of the overcurrent control 4 are controlled by means of the input signal ON/OFF via a pulse generator 2 with the switching signal Toggle. In this case, the output signal OUT of the power amplifier 14 is controlled directly via the input of the pulse width modulation PWM in that, during switch-on, the signal is enabled by set via the flip-flop 12 or the flip-flop 12 is set.

The current and the temperature of the incandescent lamp 1 may be continuously monitored by means of the current control 8 and the temperature control 10. In the case of the temperature being exceeded or the steps of the overcurrent control being exceeded, the flip-flop 12 is reset by means of the fault signal Fault at the reset input and the output signal OUT is thus directly inhibited.

In the case of such a fault-dictated switch-off operation, that is to say a fault signal Fail, the output signal OUT is inhibited, while the switching signal Toggle remains activated, however, so that the output signal is switched on anew, the current threshold value OC1, OC2 or OC3 predetermined before the switch-off operation being adopted as new maximum switch-off limit. In this case, by means of a monitoring of the fault signal Fault, various strategies can be controlled, depending on the type of fault, by means of the control device 6.

Figure 3:
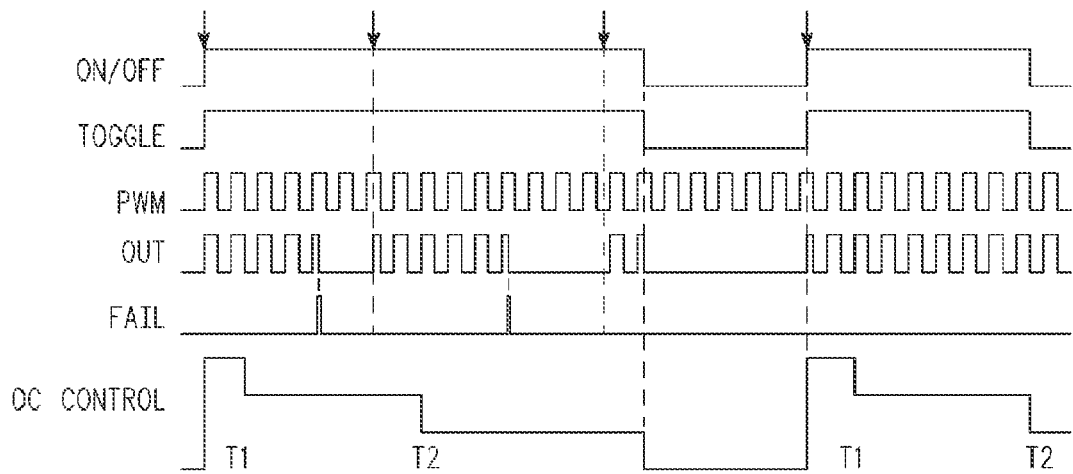
FIG. 3 shows the signal profiles of the example of a switching unit 3 in accordance with FIG. 2.
Figure 4:
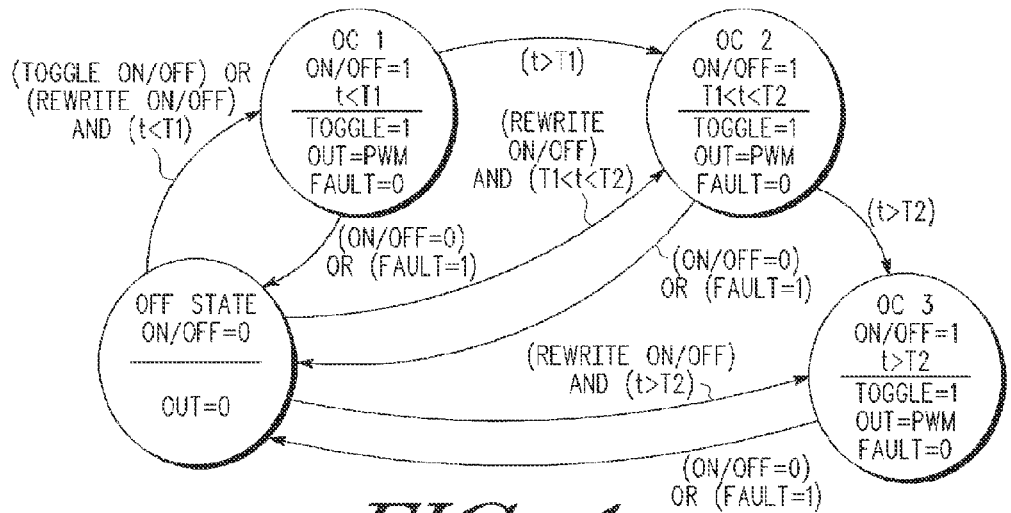
FIG. 4 shows a status diagram of the example of a circuit in accordance with FIG. 2.

For a better overview of the overcurrent control 4, FIG. 4 illustrates a status diagram of the circuit in accordance with FIG. 2/FIG. 3. In this case, the switching unit 3 is initially in the Off state. The status OC1 is attained in the event of a switch-on. In the case where the temperature of the incandescent lamp 1 rises over time t, the maximum permissible current is limited to OCT2 at T1 and is limited to OC3 when T2 is reached. Upon the occurrence of a fault Fail or upon switch-off, the system is switched back to the OFF state. In the event of a restart with an elevated temperature of the incandescent lamp, the maximum permissible current is limited to the values OC2 or OC3, depending on which status had already been activated previously.

As an alternative, such an overcurrent control can also be realized without a control device 6. This is shown by the circuit in FIG. 5 with the corresponding signal profiles in FIG. 6.

In this case, the switching unit 3 is controlled with a single input that transmits both the pulse width modulation and the status of the incandescent lamp 1. In this case, the input signal ON/OFF directly controls the status of the output signal OUT if the switching signal Toggle is positive and no fault occurs.

In the case where the temperature or current is exceeded, the flip-flop 12 is reset by means of the fault signal Fault at the reset input and the output signal OUT is thereby inhibited.

Figure 7:
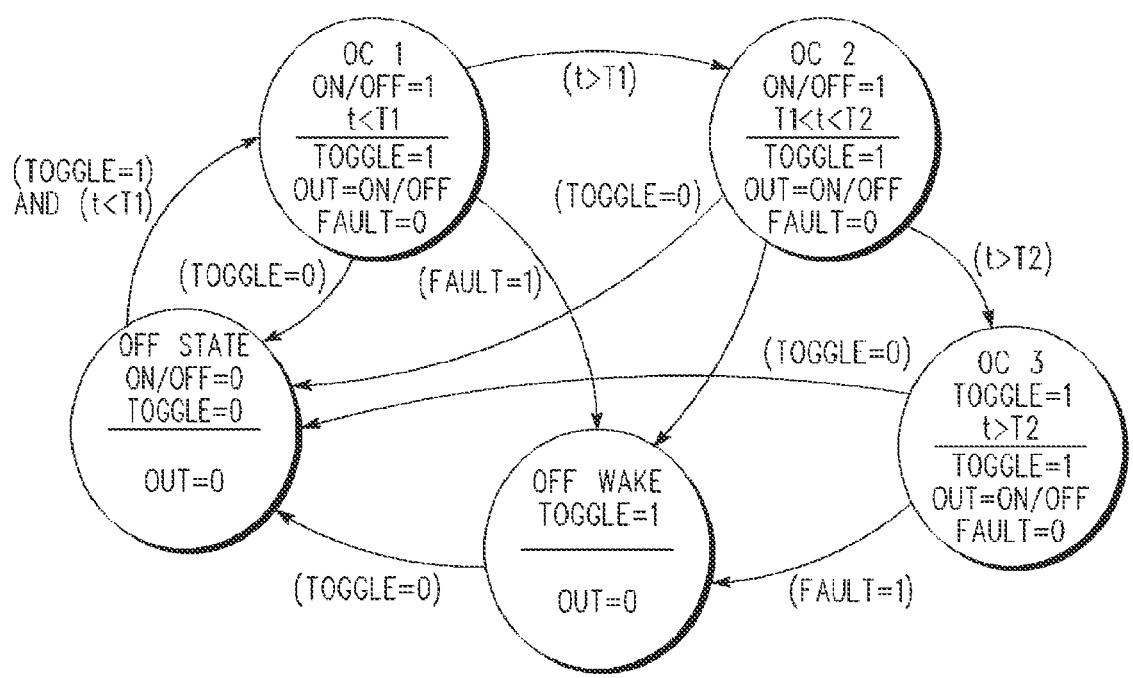
FIG. 7 shows a status diagram of the circuit in accordance with FIG. 5.

The switching unit 3 can switch on the output signal OUT again only once the inherent residence time Tm of the retriggerable monostable flip-flop 16 has elapsed. In this case, the inherent residence time Tm corresponds to the cooling time of the incandescent lamp 1 in order that, in the event of a restart, OC1 can be predetermined as maximum permissible current value. The status diagram of this circuit is illustrated in FIG. 7. In this case, there is an OFF wake status, which is activated while the inherent residence time Tm elapses. The circuit then changes to the OFF state status, from which a restart is again possible.

Figure 5:
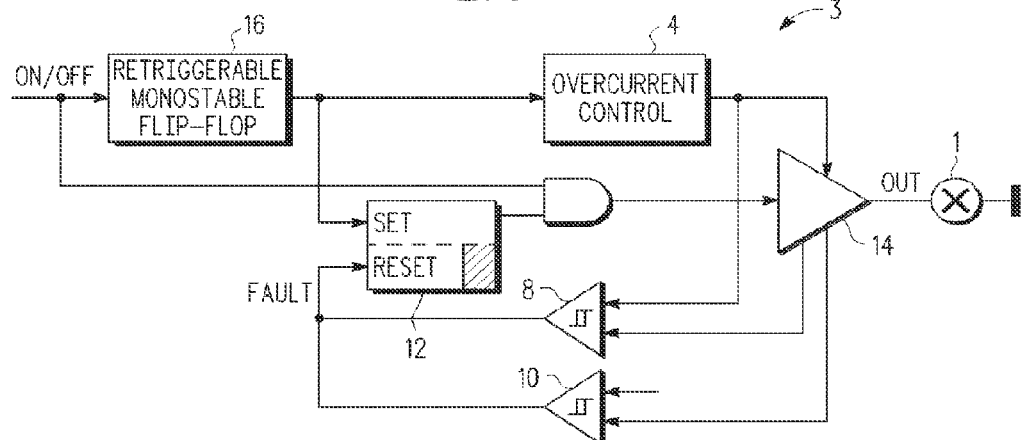
FIG. 5 shows an example of a circuit of a switching unit 3 for driving an incandescent lamp 1.
Figure 6:
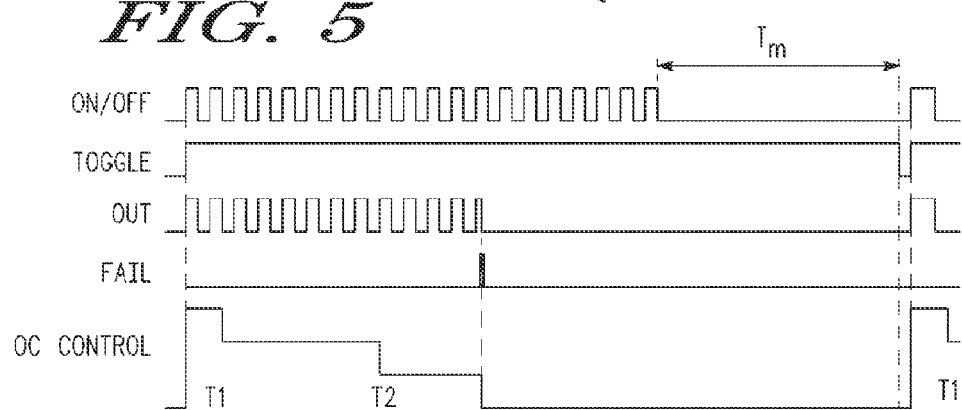
FIG. 6 shows the signal profiles of the example of a switching unit 3 in accordance with FIG. 5.
Figure 8:
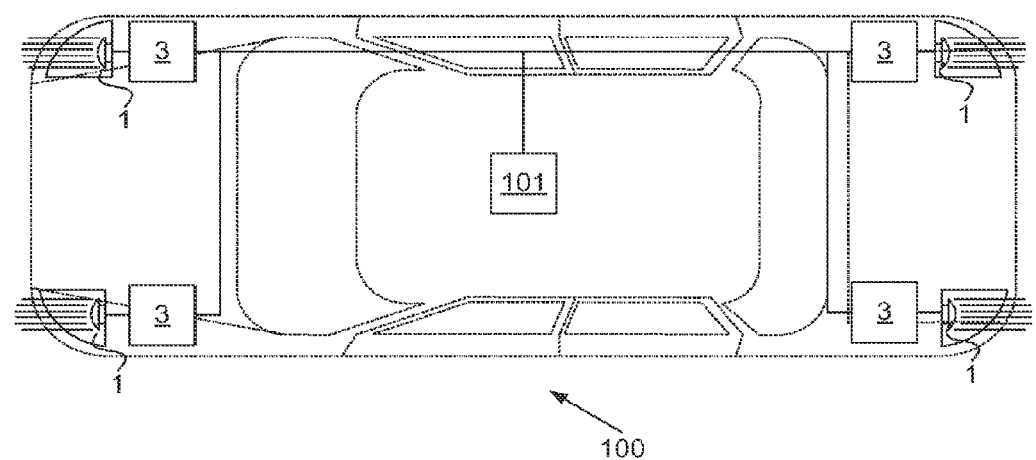
FIG. 8 shows an example of an embodiment of an apparatus in which an example of an arrangement including a switching unit and a PCT load element is used.

As shown in FIGS. 2 and 5, the switching unit 3 may be used in an assembly which includes the switching unit 3 and a PTC load, such as a incandescent lamp 1 or other PCT load. Referring to FIG. 8, such an assembly may be implemented in an apparatus, such as a vehicle 100. The vehicle 100 may including a number of PCT loads, for example head lights 101 and rear lights 102 which include incandescent lamps 1.

In the foregoing specification, the invention has been described with reference to specific examples of embodiments of the invention. It will, however, be evident that various modifications and changes may be made therein without departing from the broader spirit and scope of the invention as set forth in the appended claims. For example, the switching unit 3 may be implemented in any manner suitable for the specific implementation.

Furthermore, the devices may be physically distributed over a number of apparatuses, while functionally operating as a single device. For example, the switching unit 3 may be implemented as a number of discrete semiconductor components connected to each other in a suitable manner Also, devices functionally forming separate devices may be integrated in a single physical device. For example, However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

LIST OF REFERENCE SYMBOLS USED IN THE DRAWINGS

1 Incandescent lamp
2 Pulse generator
3 Switching unit
4 Overcurrent control
6 Control device
8 Current control
10 Temperature control
12 Flip-flop
14 Power amplifier
16 Retriggerable monostable flip-flop
100 Vehicle
101 Power source
Fail/Fault Fault signal
OC Overcurrent
ON/OFF Input signal
OUT Output signal
Toggle Switching signal

What is claimed is:

1. A device, comprising
a switching unit to drive a PTC electrical load element;
a control module coupled to the switching unit, the control module to:
control the switching unit to switch off an electric current to the PTC electrical load element when a predetermined current threshold is exceeded;
change the predetermined current threshold depending on an operational time of the PTC electrical load current;
determine a parameter value of a least one operating state or operating parameter of the load element in case the electrical current is switched off; and
set the predetermined current threshold value depending on the determined parameter value when the electrical current is switched on.

2. The device of claim 1, wherein the control module determines the current threshold value depending on a time lapsed between switching off and switching on again when said electrical current is switched on again after having been switched off.

3. The device of claim 2, wherein, when said electrical current is switched on, the control module determines the current threshold value depending on a characteristic of a switching off procedure.

4. The device of claim 2 wherein as an operating state the states are regarded in which the load is supervised by a current threshold value given for the respective operating state.

5. The device of claim 1, wherein the control module, when the electrical current is switched on, determines the current threshold value depending on a characteristic of a switching off procedure.

6. The device of claim 1, wherein as an operating state the states are regarded in which the load is supervised by a current threshold value given for the respective operating state.

7. The device of claim 1, wherein the control module stores at least one value of the respective operating parameter at the time of switching off the electrical current and wherein the control module determines the current threshold value based on the at least one stored value.

8. The device of claim 1, wherein the operating parameter includes one or more of the group consisting of: temperature of the load element, operating time of the load element, voltage drop over the load element, time lapsed after switching off the electrical current, time lapse after latest switching on, time after latest change of the current threshold value.

9. The device of claim 1, wherein the control module limits the current threshold value to be below or be equal to a maximum current threshold value, and wherein the control module sets the current threshold value to the maximum current threshold value when the electrical current is switched on.

10. The device of claim 7, wherein the maximum current threshold value corresponds to a temperature threshold for switching off the current when the temperature of the load element comes below the temperature threshold.

11. The device of claim 1, wherein the control module limits the current threshold value to be below or be equal to a maximum current threshold value, and wherein the control module sets the current threshold value to the maximum current threshold value when the electrical current is switched on after a period of time exceeding a predetermined minimal time.

12. The device of claim 1, wherein the control module, wherein, at switching on, the control module sets the current threshold value to a previous current threshold value which was applicable at the moment of switching off.

13. The device of claim 12, wherein the previous current threshold value corresponds to a temperature threshold for the temperature of the load element.

14. The device of claim 12, wherein the control module sets the current threshold value to said previous current threshold value when the electrical current is switched on after a period of time shorter than a predetermined minimal time.

15. The device of claim 14, wherein the predetermined minimal time is determined based on a cooling rate of the load element.

16. The device of claim 12, wherein the control module determines the current threshold value to be the previous current threshold value when the switching off was caused by an error.

17. The device of claim 1, wherein the control module stores at least one current threshold values, such as the current threshold value and/or a temperature threshold value, when the current is switched off.

18. The device of claim 1, wherein the control module reduces the current threshold value when a period of operating time has been exceeded after switching on the electric current.

19. The device of claim 1 wherein the switching unit automatically switches the electric current on again after switching off.

20. The device of claim 19, wherein the switching unit switches the electric current on a predetermined time after switching off the electric current.

* * * * *